US012623698B2

(12) United States Patent
Schönfeld et al.

(10) Patent No.: US 12,623,698 B2
(45) Date of Patent: May 12, 2026

(54) HIGH-POWER PLUG CONNECTOR SYSTEM

(71) Applicant: HARTING Electric Stiftung & Co. KG, Espelkamp (DE)

(72) Inventors: Alexander Schönfeld, Osnabrück (DE); Bernard Schlegel, Rahden (DE); Christof Hermoni, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 814 days.

(21) Appl. No.: 17/921,861

(22) PCT Filed: Jun. 11, 2021

(86) PCT No.: PCT/DE2021/100500
§ 371 (c)(1),
(2) Date: Oct. 27, 2022

(87) PCT Pub. No.: WO2021/259417
PCT Pub. Date: Dec. 30, 2021

(65) Prior Publication Data

US 2023/0166778 A1 Jun. 1, 2023

(30) Foreign Application Priority Data

Jun. 22, 2020 (DE) ..................... 10 2020 116 344.4

(51) Int. Cl.
*B61G 5/10* (2006.01)
*B61L 15/00* (2006.01)
*H01R 13/629* (2006.01)

(52) U.S. Cl.
CPC ............ *B61G 5/10* (2013.01); *B61L 15/0036* (2013.01); *H01R 13/62927* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 4,349,241 | A | 9/1982 | Juris et al. | |
| 5,618,204 | A | 4/1997 | Nix et al. | |
| 6,162,082 | A | 12/2000 | Karsten et al. | |
| 2001/0025830 | A1* | 10/2001 | Allard | H01H 33/24 218/118 |
| 2015/0048919 | A1* | 2/2015 | Diamanti | H01F 27/32 336/219 |
| 2017/0244449 | A1 | 8/2017 | Pape et al. | |

(Continued)

FOREIGN PATENT DOCUMENTS

| | | | |
|---|---|---|---|
| CN | 103222119 | A | 7/2013 |
| CN | 107078445 | A | 8/2017 |

(Continued)

*Primary Examiner* — Krystal Robinson
(74) *Attorney, Agent, or Firm* — Smartpat PLC

(57) ABSTRACT

An insulating element for a high-power plug connector system comprises at least one stop formation for limiting the distance of insertion into the high-power plug connector system and at least one cutout, which allows contact to be established between a receivable high-power contact and at least one electrically conductive bar. The insulating element has at least one retaining formation, which is located on the periphery of the insulating element, near the stop formation.

12 Claims, 2 Drawing Sheets

(56) References Cited

U.S. PATENT DOCUMENTS

| | | | | |
|---|---|---|---|---|
| 2019/0148876 | A1* | 5/2019 | Milroy | H01R 13/523 439/522 |
| 2019/0148879 | A1* | 5/2019 | Ochiai | H01R 13/62927 439/372 |
| 2019/0181577 | A1 | 6/2019 | Takakuwa et al. | |
| 2020/0036137 | A1* | 1/2020 | Habeb | F16B 5/0258 |
| 2022/0278489 | A1* | 9/2022 | Cording | H01R 13/629 |
| 2023/0011559 | A1* | 1/2023 | Yamada | H02K 9/223 |

FOREIGN PATENT DOCUMENTS

| | | | | | |
|---|---|---|---|---|---|
| CN | 108656983 | A | | 10/2018 | |
| CN | 109643874 | A | | 4/2019 | |
| DE | 3118490 | A1 | | 3/1982 | |
| DE | 4126923 | | * | 1/1993 | F21V 23/06 |
| DE | 4126923 | C1 | | 1/1993 | |
| DE | 60006937 | | | 5/2004 | |
| DE | 60004607 | | | 6/2004 | |
| EP | 0638965 | A2 | | 2/1995 | |
| EP | 2085977 | | * | 8/2009 | H01B 9/003 |
| EP | 2581643 | A1 | | 4/2013 | |
| JP | H06151003 | A | | 5/1994 | |
| KR | 20140091604 | A | | 7/2014 | |

* cited by examiner

HIGH-POWER PLUG CONNECTOR SYSTEM

TECHNICAL FIELD

The disclosure relates to an insulating body for a high-power plug connector system. Such insulating bodies are used to insulate high-power cables in a high-power plug connector system from the surroundings which for safety reasons must not be connected to electrically conductive components. The focus here is particularly on applicability in underfloor regions of rail vehicles, in particular the connection of power cars and self-propelled railcars to one another.

BACKGROUND

Solutions are known in the prior art which enable the transmission and/or distribution of high electrical currents and/or voltage between vehicles or between vehicles with modules coupled to them. However, these solutions mostly provide disadvantageous and partially undetachable fixing of the corresponding contact elements.

A particular disadvantage of the prior art is the inconvenient maintenance and generally also a high space requirement. However, especially in the case of highly stressed contact elements, such as for example in the field of rail transportation, because of the ever higher demands being made, there is a growing need for repair and maintenance, for example, owing to increased electrical erosion caused by the high current strengths of over 500 A.

Insulating bodies are known in the prior art with a wide range of designs but there is no design which allows quick and simple assembly or mounting. Especially in the field of high-power plug connectors, it is desirable that the relatively large components allow simple handling during mounting, maintenance, and/or repair. The prior art presents no satisfactory solution in this field.

In the priority application for the present application, a search by the German Patent and Trademark Office yielded the following prior art: DE 600 06 937 T2, DE 600 04 607 T2, DE 31 18 490 A1, and EP 0 863 579 A2.

SUMMARY

The disclosure provides an insulating body for a high-power plug connector system which particularly simple handling during assembly, maintenance, and/or repair.

The disclosure further provides a high-power plug connector system which is designed for the use of an insulating body.

One embodiment provides an insulating body for a high-power plug connector system having at least one stop shape for limiting the insertion distance into the high-power plug connector system and at least one recess which enables the contacting of an accommodatable high-power contact with at least one electrically conductive busbar, wherein the insulating body has at least one retaining shape which is situated on the circumference of the insulating body in the vicinity of the stop shape. The insulating body and the high-power plug connector are here designed in particular for current strengths equal to or greater than 80 amperes, preferably current strengths above 500 amperes, specifically current strengths in the region of 800 amperes. Current strengths in the region of 1000 amperes, or even current strengths in the region of 1200 amperes, can furthermore also be implemented. It is thus in particular ensured that use in the field of rail vehicles, in particular in the underfloor region of railcars, power cars, and self-propelled railcars is possible. With respect to the distance of the retaining shape from the stop shape, the phrase "in the vicinity" should be understood to be essentially a distance equal to or less than 25 mm. The phrase "in the vicinity" should in particular be understood to be a distance equal to or less than 10 mm. The phrase "in the vicinity" is preferably to be understood as a distance equal to or less than 5 mm.

A preferred embodiment provides that the retaining shape is shaped so as to be moved into positive engagement with at least one fastening shape on a cable connection housing of the high-power plug connector system. This in particular means that the retaining shape is shaped as at least one protrusion on the insulating body. A retaining shape integrally formed radially here acts in a very particularly advantageous fashion, wherein the retaining shape can be brought into engagement with the fastening shape in the manner of a bayonet lock.

In an expedient embodiment, the retaining shape is configured so that it is essentially congruent with the fastening shape. This means that the retaining shape passes, at least in one orientation, first through a passage opening in the cable connection housing. After the insulating body has been rotated, the retaining shape and the fastening shape are then brought into overlapping engagement. Further shaped elements can here ensure an interlocked connection. For this purpose, the retaining shape and the fastening shape can have, for example, a tongue and groove, cams, wedges, or comparable elements which engage with each other.

In a clever embodiment, the retaining shape passes through at least one cutout in the cable connection housing for fastening purposes, wherein the cutout is connected to the passage opening. This means that the retaining shape extends essentially over the radius of the passage opening. A corresponding fastening shape thus predetermines essentially the radius of the passage opening but allows the retaining shape of the insulating body to pass through at least one cutout.

In a further embodiment, the retaining shape is configured so that it is essentially congruent with the cutout. This embodiment ensures in a simple way that the retaining shape can pass through the passage opening in order then to be brought into engagement with the fastening shape. An embodiment in which the retaining shape, the fastening shape, and the cutout are designed congruently here appears to be particularly expedient.

An embodiment provides that the retaining shape and the fastening shape are oriented in an operational state in such a way that the recess enables the mounting of the busbar to the high-power contact accommodated by the insulating body. This means that, after the retaining shape and the fastening shape have been brought into engagement, the insulating body the recess faces in a direction in which the high-power contact which is carried by the insulating body is fixed to the busbar in the cable connection housing. For example, the insulating body is arranged in the operational state in such a way that the recess faces in the direction of a housing cover of the cable connection housing. In this way, a busbar for transmitting electrical current and/or electrical voltage can then be applied to and fixed on the high-power contact, for example by a screw.

In a further embodiment, the insulating body is designed with at least one shaped element, which advantageously enlarges air gaps and creepage distances, at least on an interior side. The shaped element is advantageously designed essentially as a corrugated shape. The corrugated shape is here formed from at least two circumferential, spaced-apart rings on the inside of the insulating body. A materially bonded connection of the rings to the insulating body is very particularly expedient here. An embodiment with rings integrally formed on the insulating body is especially expedient.

A further object is achieved by a high-power plug connector system for connecting and/or distributing electrical current and/or electrical voltage, wherein the high-power plug connector system has a cable connection housing and an interior, wherein the interior has at least two passage openings into which in each case at least one insulating body can be inserted. The cable connection housing here has at least one fastening shape, arranged on the passage opening, which is designed to positively fix the insulating body. The passage opening particularly preferably has at least one cutout which is shaped to be at least congruent with a retaining shape of the insulating body. A cutout can be slightly larger than the retaining shape in order to make mounting simple. Because of its ability to accommodate an insulating body according to the disclosure, a high-power plug connector system configured in this way affords a more compact structure than is usual in the prior art. Furthermore, by virtue of the interaction of the retaining shape of the insulating body and the fastening shape of the cable connection housing, mounting, maintenance, and/or repair of such a high-power plug connector system are significantly improved. It may be necessary to alter the position of the cable connection housing during mounting, maintenance, and/or repair because of the required structural size of the cable connection housing. By bringing the retaining shape and the fastening shape into engagement, a user can first insert an insulating body into the cable connection housing and fix it there such that they can take hold of the cable connection housing and change its position without the insulating body losing its intended positioning.

BRIEF DESCRIPTION OF THE DRAWINGS

An exemplary embodiment of the invention is illustrated in the drawings and will be explained in detail below.

DETAILED DESCRIPTION

The drawings contain partly simplified schematic illustrations. Identical reference symbols are partly used for the same but possibly not identical elements. Different views of the same elements could be to a different scale.

Specifications of directions such as, for example, “left”, “right”, “above”, and “below” are to be understood with reference to the respective drawing and can vary in the individual illustrations with respect to the object illustrated.

Figure 1:
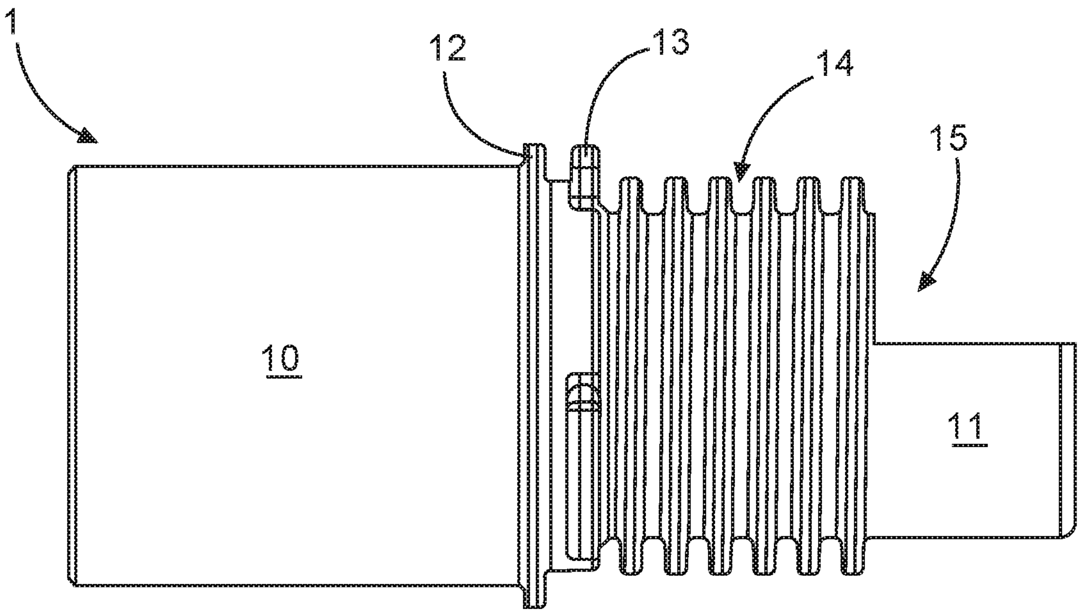
FIG. 1 shows an illustration from the side of an insulating body.
Figure 2:
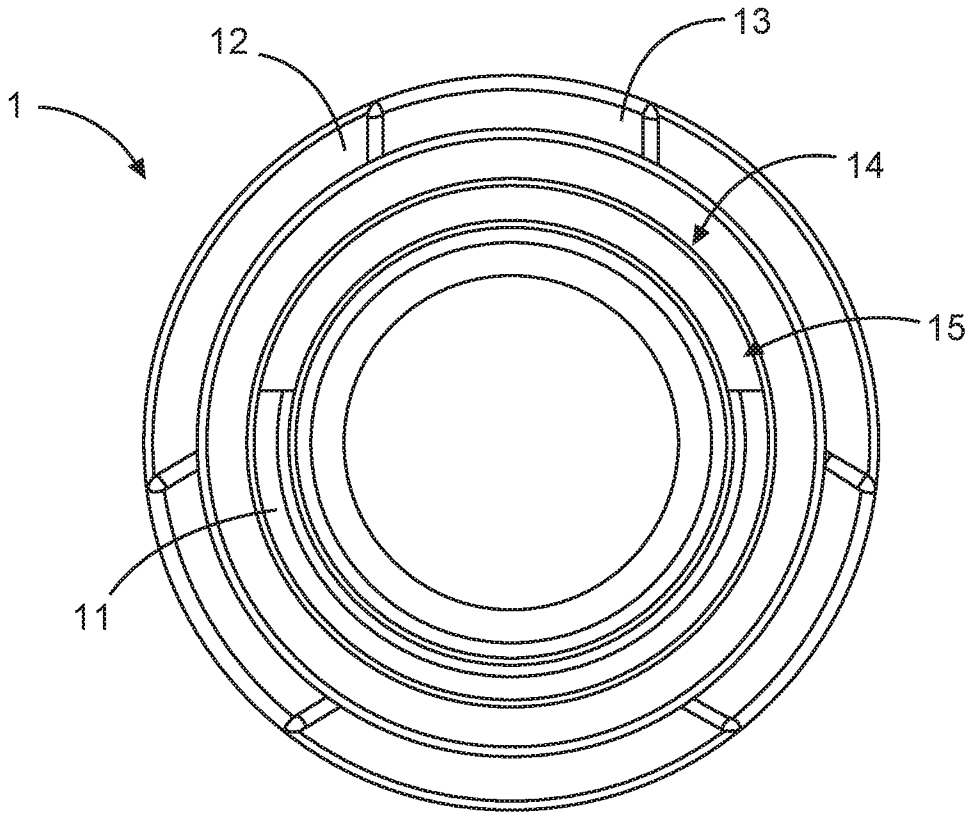
FIG. 2 shows an illustration of an insulating body in a view of the interior side.

FIG. 1 shows an insulating body 1 in a side view. FIG. 2 shows the insulating body 1 in a view from an interior side 11 in the direction of a stop shape 12. The structure here provides an essentially hollow cylindrical shape which has a plug connector side 10 and the interior side 11. The plug connector side 10 and the interior side 11 are here separated by the stop shape 12. In the exemplary embodiment shown, the stop shape 12 is configured as a circumferential ring. At least one retaining shape 13 is situated close to the stop shape 12 on the interior side 11. In the embodiment shown, three retaining shapes 13 are integrally formed on the interior side 11 of the insulating body 1. The retaining shapes 13 are here arranged so that they are offset circumferentially by essentially 120°, which is particularly clear in the view in FIG. 2. The interior side 11 furthermore has a corrugated shape 14 which is designed to advantageously enlarge air gaps and creepage distances in the interior 8 of a cable connection housing 4. The corrugated shape 14 is essentially several rings integrally formed circumferentially. The corrugated shape 14 is here shaped particularly expediently with at least two rings, even better with at least four rings, or ideally, as in the case illustrated, at least six rings. Lastly, the embodiment shown also provides a recess 15 which enables an electrically conductive busbar 3 arranged in the cable connection housing 4 to be capable of being brought into engagement with a high-power plug contact 5 inserted into the insulating body 1 in a particularly space-saving fashion.

Figure 3:
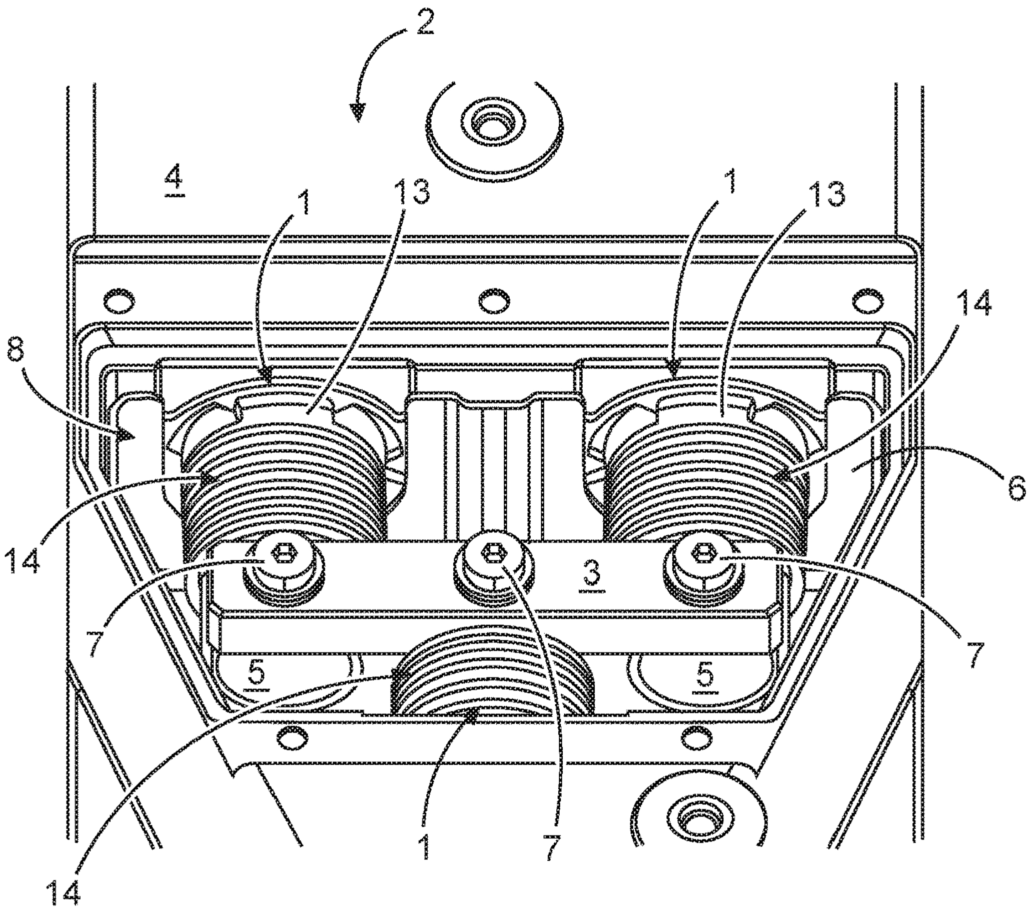
FIG. 3 shows an illustration of a high-power plug connector system with three inserted insulating bodies.
Figure 4:
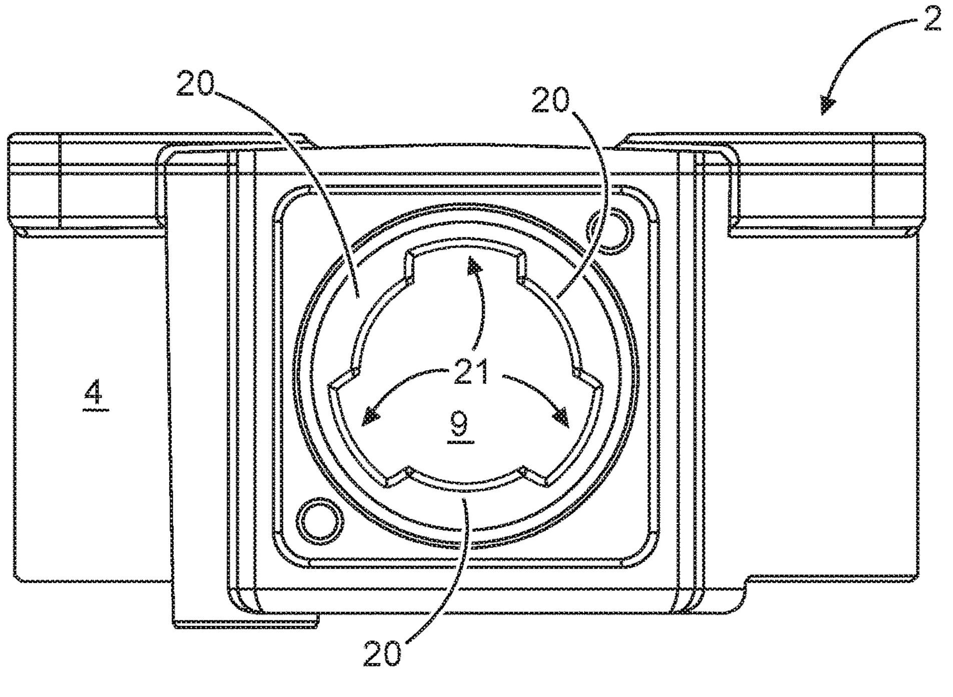
FIG. 4 shows an illustration of a cable connection housing of a high-power plug connector system.

FIG. 3 shows the interaction of different components of a high-power plug connector system 2. First, the cable connection housing 4 can be seen here. Such a cable connection housing 4 is usually a metal housing, at least the majority of which is painted. An insulating shell 6 can be seen in an interior 8 shaped in the cable connection housing 4. Three insulating bodies 1 with high-power contacts 5 inserted therein project into the interior 8. The high-power contacts 5 have a plane region to which the electrically conductive busbar 3 can be applied. Threaded openings on the high-power contacts 5 enable the busbar 3 to be fixed by means of fastening elements 7, for example hexagon socket screws. The use of other or comparable fastening elements and/or shaft-hub connections are known to a person skilled in the art. Lastly, it is also clear from the illustration that the corrugated shape 14 of the insulating bodies 1 advantageously influence the air gaps and creepage distances in the interior 8 of the busbar 3 and the high-power contacts from the cable connection housing 4. An insulating shell which is not illustrated and is inserted into the insulating shell 6 illustrated additionally ensures that the air gaps and creepage distances are at least observed according to specifications. The nesting of the insulating shells is ideally configured in such a way that the specifications are exceeded at least slightly positively. It can furthermore be seen that the retaining shapes 13 of the insulating bodies 1 bear against the cable connection housing 4. For this purpose, the insulating bodies 1 pass through passage openings 9 arranged in the cable connection housing 4. It is clear in FIG. 4 that the passage openings 9 have fastening shapes 20. It is furthermore clear that the fastening shapes 20 are separated by cutouts 21. The cutouts 21 enable an insulating body 1 with its retaining shapes 13 to pass through each passage opening 9 and then, by rotating the insulating bodies 1, to arrange the latter positively on the fastening shapes 20 by means of their retaining shapes 13.

Even though different aspects or features of the invention are shown in the drawings in each case in combination, unless otherwise stated, it is clear to a person skilled in the art that the combinations illustrated and discussed are not the only ones possible. In particular, corresponding units or groups of features from different exemplary embodiments can be interchanged.

The articles “a” and “an” as used in this application should generally be construed to mean “one or more” unless specified otherwise or clear from context to be directed to a singular form.

LIST OF REFERENCE SYMBOLS

1 insulating body
2 high-power plug connector system
3 busbar
4 cable connection housing
5 high-power plug contact
6 insulating shell
7 fastening element
8 interior
9 passage opening
10 plug connector side
11 interior side
12 stop shape
13 retaining shape
14 corrugated shape
15 recess
20 fastening shape
21 cutout

The invention claimed is:

1. An insulating body (1) for a high-power plug connector system (2), comprising:

a radially outwardly projecting stop flange (12) for limiting an insertion distance into the high-power plug connector system (2);

a recess (15) configured to receive a high-power contact (5) with an electrically conductive busbar (3); and a retaining lug (13) which projects radially outwardly from a circumference of the insulating body (1) axially adjacent to the stop flange (12), wherein the insulating body (1) is designed with a shaped element, which enlarges air gaps and creepage distances, at least on an interior side (11).

2. The insulating body (1) as claimed in claim 1, wherein the retaining lug (13) is shaped so as to be moved into positive engagement with a fastening shape (20) on a cable connection housing (4) of the high-power plug connector system (2).

3. The insulating body (1) as claimed in claim 2, wherein the retaining lug (13) is configured so that it is essentially congruent with the fastening shape (20).

4. The insulating body (1) as claimed in claim 2, wherein the retaining lug (13) passes through a passage opening (9) in the cable connection housing (4) for fastening purposes.

5. The insulating body (1) as claimed in claim 2, wherein the retaining lug (13) and the fastening shape (20) are oriented in an operational state in such a way that the recess (15) enables mounting of the busbar (3) to the high-power contact (5) accommodated by the insulating body (1).

6. The insulating body (1) as claimed in claim 1, wherein the shaped element is designed essentially as a corrugated shape (14).

7. The insulating body (1) as claimed in claim 6, wherein the corrugated shape (14) is formed from at least two circumferential, spaced-apart rings on an inside (11) of the insulating body (1).

8. An insulating body (1) for a high-power plug connector system (2), comprising:

a radially outwardly projecting stop flange (12) for limiting an insertion distance into the high-power plug connector system (2);

a recess (15) configured to receive a high-power contact (5) with an electrically conductive busbar (3); and a retaining lug (13) which projects radially outwardly from a circumference of the insulating body (1) axially adjacent to the stop flange (12), wherein the retaining lug (13) is shaped so as to be moved into positive engagement with a fastening shape (20) on a cable connection housing (4) of the high-power plug connector system (2), wherein the retaining lug (13) passes through a passage opening (9) in the cable connection housing (4) for fastening purposes, wherein the retaining lug (13) passes through a cutout (21) in the cable connection housing (4) for fastening purposes, and wherein the cutout (21) is connected to the passage opening (9).

9. The insulating body (1) as claimed in claim 8, wherein the retaining lug (13) is configured so that it is essentially congruent with the cutout (21).

10. The insulating body (1) as claimed in claim 8, wherein the insulating body (1) is designed with a shaped element, which advantageously enlarges air gaps and creepage distances, at least on an interior side (11).

11. A high-power electrical plug connector system (2), comprising:

a cable connection housing (4) having an interior (8);

at least two passage openings (9) in the cable connection housing (4) leading into the interior (8);

a respective insulating body (1) extending through each of the at least two passage openings (9), the insulating body (1) having a radially outwardly projecting stop flange (12) for limiting an insertion distance through the respective passage opening (9), a recess (15) configured to receive a high-power contact (5) with an electrically conductive busbar (3), and a retaining lug (13) projecting radially outwardly from a circumference of the insulating body (1) axially adjacent to the stop flange (12), and a corrugated shape which enlarges air gaps and creepage distances the interior (8); and a fastening shape (20), arranged on each of the at least two passage openings (9) to receive the respective retaining lug (13) and positively fix the insulating body (1).

12. The high-power plug connector system (2) as claimed in claim 11, wherein each of the at least two passage openings (9) has at least one cutout (21) which is shaped at least congruently with the respective retaining lug (13) of the insulating body (1).

* * * * *